UNITED STATES PATENT OFFICE.

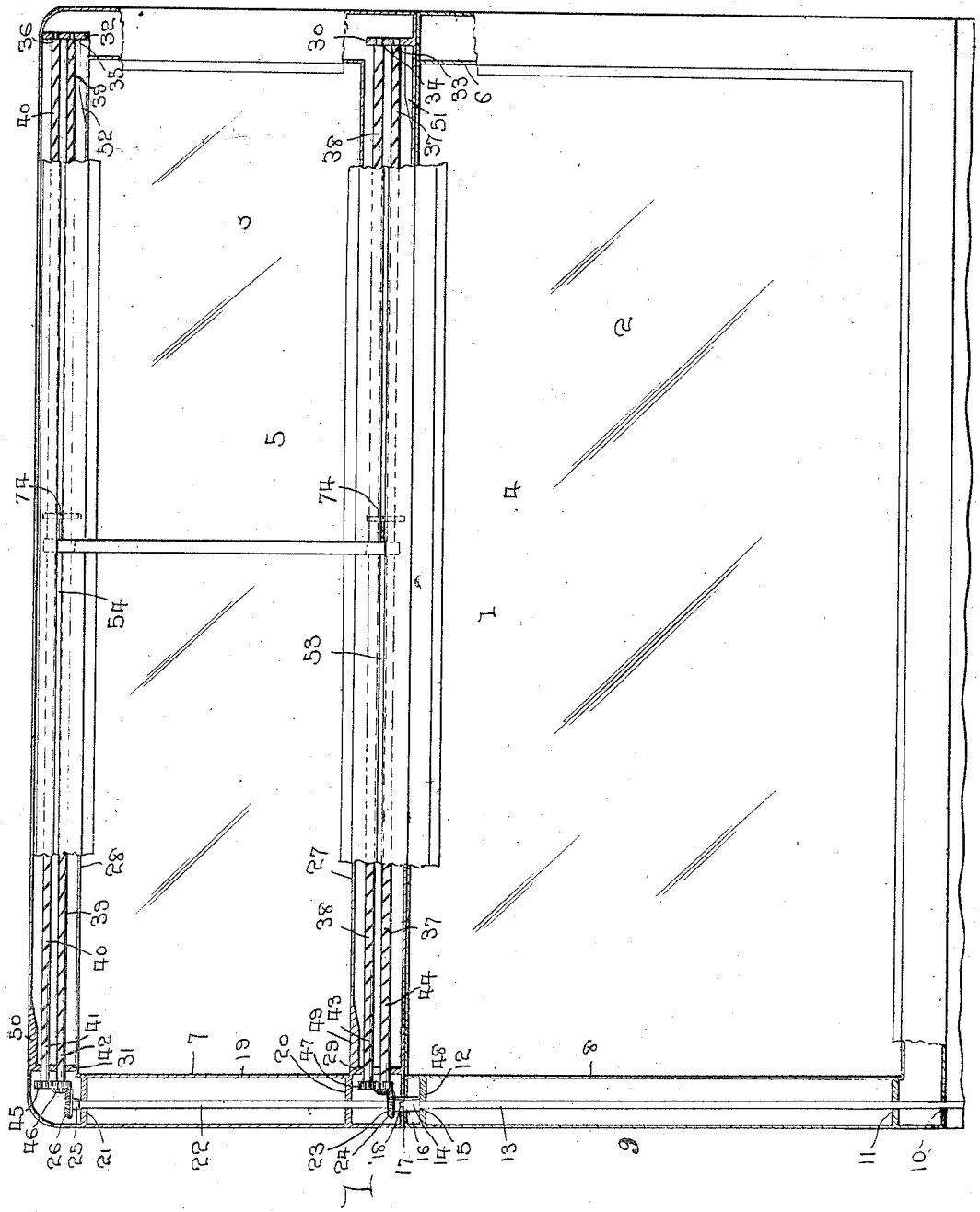

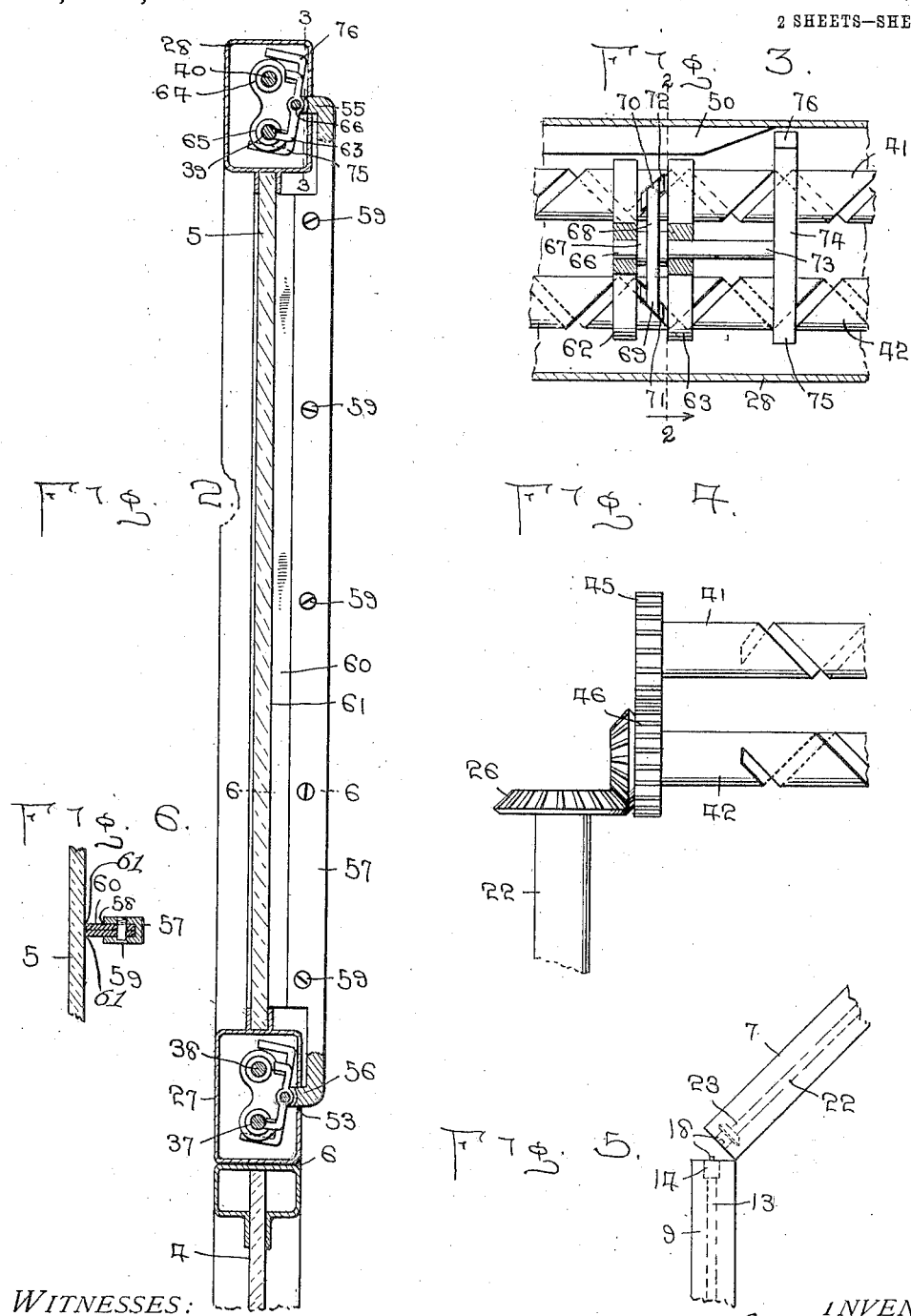

FRANK KLITCHKO, OF CLEVELAND, OHIO.

SHIELD-CLEANER.

1,086,371.  Specification of Letters Patent.  Patented Feb. 10, 1914.

Application filed January 27, 1912. Serial No. 673,765.

*To all whom it may concern:*

Be it known that I, FRANK KLITCHKO, a citizen of the United States, residing at Cleveland, in the county of Cuyahoga and State of Ohio, have invented certain new and useful Improvements in Shield-Cleaners, of which the following is a specification.

This invention relates to a new and useful cleaner, more especially for automobile shields, and has for its object the production of a device which will clean off the glass shields, such as are used with automobiles, while the vehicle is moving and prevent the formation upon the glass of a coating of ice or snow or even rain water.

The invention consists in the construction hereinafter set forth.

In the annexed drawings: Figure 1 is a front view of an automobile glass shield, provided with the invention, parts being in section. Fig. 2 is a vertical transverse section through the shield, showing parts of the device in side elevation and parts in section. Fig. 3 is an enlarged detail view of portions of the device showing the reversing mechanism. Fig. 4 is an enlarged detail view showing the engagement of the ends of shafts. Fig. 5 is an enlarged detail view showing the clutch connection of the vertical shaft. Fig. 6 is a section of Fig. 2, on line 6—6.

In these drawings: The numeral 1 represents an automobile shield having the usual stationary lower part 2 and the hinged upper part 3, each having a glass plate therein 4 and 5. The shield 1 is provided with a hollow rim 6 of suitable metal. This rim 6 is divided into two portions, the upper portion 7 which surrounds the upper part 3 of this shield 1, and the lower portion 8 which surrounds the lower part 2 of the shield 1. At one end 9, the lower portion 8 of the rim 6 is provided with bearings 10, 11 and 12, the first two at the bottom and the last at the top of the end 9. In these bearings 10, 11 and 12 loosely fits a vertical shaft 13, having a head 14, just above the bearing 12, the shoulder 15 of this head 14 resting on top of the bearing 12. The head 14 projects through an opening 16 in the top 17 of the end 9 of the lower portion 8 of the rim 6 and is constructed with a portion of a clutch mechanism 18 which may be of any form consisting of a pin and socket. The end 19 of the upper portion 7 of the rim 6 is alined with the end 9 of the lower portion 8 of the rim 6 and is hollow. The end 19 is provided with bearings 20 and 21, the former near the bottom and the latter near the top of the end 19. In these bearings 20 and 21 loosely fits a vertical shaft 22, having at its lower end 23, the other portion of the clutch mechanism 18 and also a bevel gear wheel 24. At its top end 25, above the bearing 21, this shaft 22 has another gear wheel 26. The bottom and top rails 27 and 28 of the upper portion 7 of the rim 6 are hollow and have at their ends the bearings 29, 30, 31 and 32, each having two openings therethrough. In the openings in bearings 30 and 32 fit loosely the ends 33, 34, 35 and 36 of two pairs of screw threaded shafts 37, 38, 39 and 40. The other ends 41, 42, 43 and 44 of the shafts 37, 38, 39 and 40 pass loosely through the openings in the bearings 29 and 31 and have on their ends, beyond these bearings, intermeshing gear wheels 45, 46, 47 and 48. Beyond these wheels 46 and 48, to the ends of the shafts 37 and 39 are secured beveled wheels to engage the bevel wheels 24 and 26 on the vertical shaft 22. The bottom and top rails 27 and 28 have at their ends at the top just inside of the bearings 29 and 31 an incline 49 and 50, the slope being downwardly toward the bearings, and at their other ends at the bottom similar inclines 51 and 52. The rails 27 and 28 are made with longitudinal slots 53 and 54, one in each rail, on the outside of the shield 1. Passing through these slots 53 and 54, into the interiors of the hollow rails 27 and 28 are the upper and lower ends 55 and 56 of the cleaner carrier 57. This is a frame having the channel 58 in which by screws 59 are held a number of sheets 60, preferably of rubber. When in place the edges 61 of the sheets of rubber rest against the outer surface of the glass 5 of the upper part 3 of the shield.

The ends of the carrier are constructed alike and have attached to them similar shifting mechanism, so one only will be described. The end 55 of the carrier 57 has the forks 62 and 63 within the interior of the top rail 28 of the rim of the shield. These forks 62 and 63 have, each of them, two smooth holes 64 and 65, through which loosely pass the shafts 40 and 39. In these forks 62 and 63 is journaled a rocking shaft 66, to which between the forks 62 and 63 is fastened the hub 67 of a catch 68 having the two arms 69 and 70 each provided with a head 71 and 72 which fit and are adapted to the threads of the shafts 41 and 42. The shaft 66 extends out from the fork 63 and has fastened on its end 73 a tripper 74 having the two arms 75 and 76, which extend inwardly toward the shafts 41 and 42.

Operation: The shaft 13 at its lower end is to be connected with any of the parts of the automobile, for example the water pump, so that the said shaft may be turned, when the automobile is in motion. When the upper part 3 of the shield is up the clutch 18 joins the shaft 13 and the shaft 22 as one shaft. Power communicated to these combined shafts is through the gear wheels 24 and 48 and 26 and 46 communicated to the shafts 37 and 39 and through the wheels 47 and 45 to the other shafts 38 and 40. One head of the catch 68 being on the corresponding thread of one of the screw-threaded shafts, as the shafts are turned, the carrier 57 will move across the face of the glass 5, the edges 61 of the rubber sheets 60 wiping the glass and preventing any snow, sleet or even water from accumulating and clouding the glass. When the carrier 57 reaches the end of the shield, the arm of the tripper 74 will pass under the incline at that end causing the catch 68 to be thrown from the shaft, which has been moving the carrier, over into engagement with the other shaft which will reverse the movement of the carrier and make it travel back over the face of the shield. When not desirable to have the cleaner used, the shield may be tipped enough to release the clutch 18.

Having described my invention, what I claim is:—

1. As an attachment for an automobile shield, a cleaner therefor and two shafts, one shaft for moving the cleaner in one direction across the shield and the other shaft for moving the cleaner in the opposite direction across the shield.

2. As an attachment for an automobile shield, a cleaner therefor, pairs of shafts for moving such cleaner over the face of the shield in both directions, engaging means for engaging the cleaner with such shafts; and shifting means for shifting the engaging means into and out of engagement with the cleaner moving shafts.

In testimony whereof I affix my signature in presence of two witnesses.

FRANK KLITCHKO.

Witnesses:
    FRANK C. OSTER,
    JOHN J. CARROLL.